United States Patent [19]

Toyama et al.

[11] Patent Number: 5,023,658

[45] Date of Patent: Jun. 11, 1991

[54] IMAGE FORMING APPARATUS

[75] Inventors: Yoshikuni Toyama, Yokohama; Kazuo Kagiura, Tokyo; Hiroyoshi Maruyama, Yokohama; Tatsuya Shiratori, Kawasaki; Masashi Ohashi, Tokyo; Masanari Shirai, Chigasaki; Eiichi Ando, Toride, all of Japan

[73] Assignee: Canon Kabushiki Kaisha, Tokyo, Japan

[21] Appl. No.: 555,369

[22] Filed: Jul. 20, 1990

Related U.S. Application Data

[63] Continuation of Ser. No. 311,279, Feb. 16, 1989, abandoned.

[30] Foreign Application Priority Data

Feb. 20, 1988 [JP] Japan ............................... 63-037866
Feb. 20, 1988 [JP] Japan ............................... 63-037867

[51] Int. Cl.[5] ............................................ G03B 27/58
[52] U.S. Cl. ...................................... 355/72; 271/145; 354/275
[58] Field of Search ......................... 355/72, 212, 235; 354/174, 275, 276; 271/145

[56] References Cited

U.S. PATENT DOCUMENTS

| | | | |
|---|---|---|---|
| 4,364,656 | 12/1982 | Yanagawa | 355/212 |
| 4,553,831 | 11/1985 | Dixon | 355/72 X |
| 4,719,491 | 1/1988 | Katoh et al. | 355/235 |
| 4,922,291 | 5/1990 | Adachi | 355/72 |

FOREIGN PATENT DOCUMENTS

| | | |
|---|---|---|
| 62-50771 | 3/1987 | Japan . |
| 62-65051 | 3/1987 | Japan . |
| 2126993 | 4/1984 | United Kingdom . |

*Primary Examiner*—Richard A. Wintercorn
*Attorney, Agent, or Firm*—Fitzpatrick, Cella, Harper & Scinto

[57] ABSTRACT

The present invention relates to an image forming apparatus in which a sheet cassette for containing sheets is removably mounted to a body of the apparatus. The image forming apparatus comprises a frame structure having a pair of legs spaced apart from each other, a bottom plate arranged on the legs, a first side plate arranged at one ends of the legs and uprightly mounted on the bottom plate, a second side plate arranged in confronting relation to the first side plate at the other ends of the legs and having a lower end portion extending below the legs and covering the other ends of the legs, and stay members for interconnecting the first and second side plates at their upper portions.

15 Claims, 5 Drawing Sheets

IMAGE FORMING APPARATUS

This application is a continuation of application Ser. No. 311,279 filed 02/16/89 now abandoned.

BACKGROUND OF THE INVENTION

1. Field of the Invention

The present invention relates to an image forming apparatus, and more particularly, it relates to a frame structure of a floating-type image forming apparatus wherein a sheet cassette is inserted into the apparatus from ahead of the apparatus.

2. Related Background Art

In the past, a general conventional image forming apparatus such as a copying machine, printer and the like was so designed that a sheet cassette was inserted into the apparatus from the side thereof along a sheet feeding direction. To this end, the image forming apparatus was provided with a cassette inserting opening at the side of a frame body of the apparatus.

Recently, in order to improve the operability of the apparatus, a floating-type image forming apparatus wherein a sheet cassette is inserted into the apparatus from ahead of the frame body thereof has been proposed.

In such a floating-type image forming apparatus, the sheet cassette was mounted on or dismounted from the apparatus sideways. That is to say, the sheet cassette was shifted (inserted or removed) in a direction perpendicular to the sheet feeding direction. Accordingly, a longitudinal dimension of the cassette inserting opening was obliged to be increased; thus, when the cassette inserting opening was obtained by forming an elongated slot in the frame body as in the conventional case, there arose a problem that the apparatus became large-sized and/or the mechanical strength of the frame body of the apparatus was decreased.

SUMMARY OF THE INVENTION

Accordingly, it is an object of the present invention to provide a simple frame structure of an image forming apparatus, which does not decrease the mechanical strength of the frame of the apparatus even if a sheet cassette is mounted on or dismounted from the apparatus from ahead thereof, thereby solving the above-mentioned problem.

According to an aspect of the present invention, there is provided an image forming apparatus in which, for example a sheet cassette is mounted to or dismounted from a frame of the apparatus, wherein a cassette mounting portion for mounting the cassette thereon is provided on a base and a framework comprising a bottom plate positioned on an upper portion of the base, a first side plate uprightly mounted on the bottom plate, a second side plate opposed to the first side plate and extending below the base and at least one stay member for interconnecting the first and second side plates at their upper portions is also provided.

With the construction mentioned above, a frame can be designed to have an adequate space with a simple and stronger construction while permitting the mounting and dismounting of the cassette.

As mentioned above, according to the present invention, by arranging the framework comprising the bottom plate, first and second side plates and at least one stay member on the base having the cassette mounting portion, it is possible to obtain a strong frame structure having an adequate space with a simple construction, without the use of additional reinforcing members, even if the cassette inserting opening is formed in the frame.

Further, according to another aspect of the present invention, there is provided an image forming apparatus in which, for example a sheet cassette is mounted to or dismounted from a frame of the apparatus, wherein a pair of legs which are discrete from a frame are arranged below the frame, and guide portions for guiding the cassette as the cassette is mounted on or dismounted from the frame are arranged on the legs.

In addition, in facilitate the lifting of the frame, at least one concave gripping portion may be provided on an undersurface of the leg.

With the arrangement mentioned above, the guide portions for guiding the cassette during the mounting or dismounting of the cassette are provided on the pair of the legs without making the frame large sized and also without decreasing the mechanical strength of the frame, whereby the cassette can be mounted to or dismounted from the frame while being guided by the guide portions. Further, the frame can be easily lifted by hands through the concave gripping portion.

According to the present invention, since the pair of legs which are discrete from the frame are arranged below the frame and the guide portion for guiding the cassette is provided on the legs, the cassette can be mounted to or dismounted from the frame, without decreasing the strength of the frame and without making the frame large-sized. Further, since the legs are strong and rigid, the cassette can be stably mounted and dismounted.

DESCRIPTION OF THE PREFERRED EMBODIMENTS

The present invention will now be explained in connection with embodiments thereof with reference to the accompanying drawings.

Figure 1:
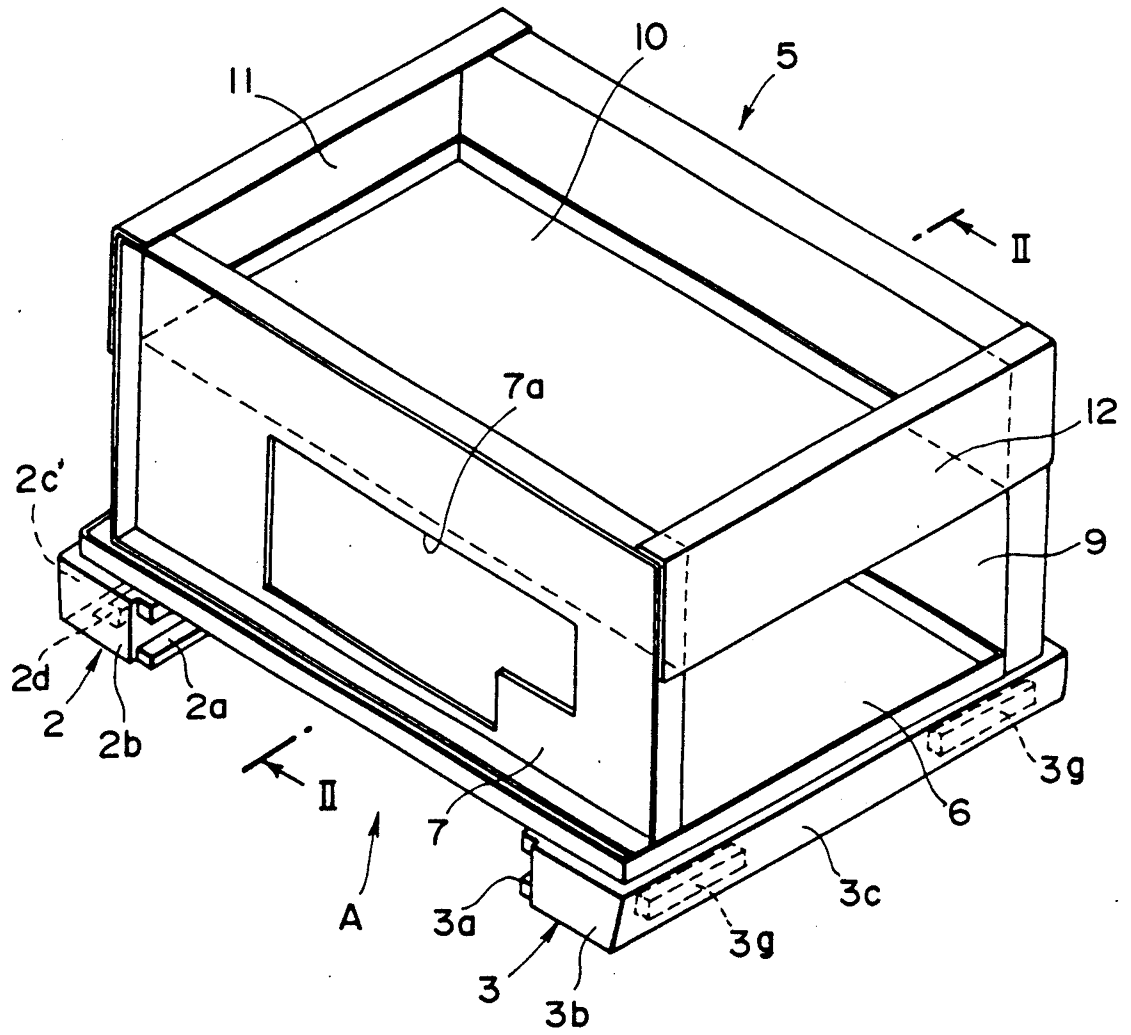
FIG. 1 is a perspective view of a frame work of the image forming apparatus embodied as a copying machine, according to an embodiment of the present invention.
Figure 2:
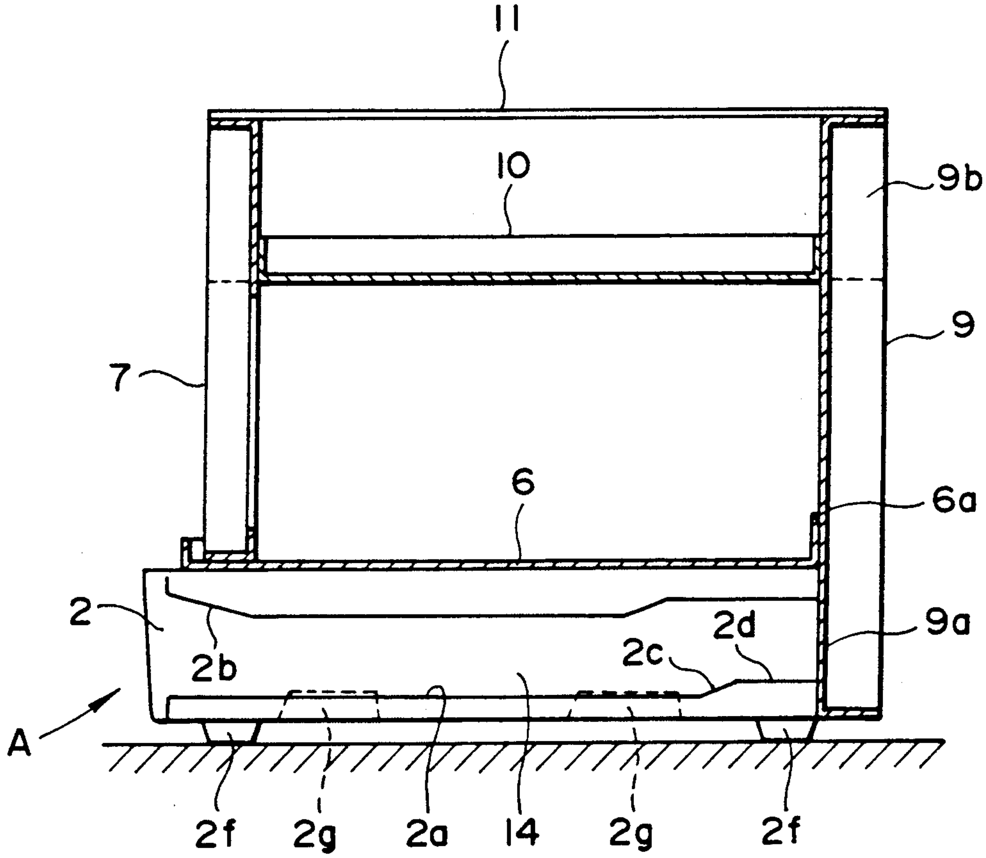
FIG. 2 is a sectional view taken along the line II—II of FIG. 1.
Figure 3:
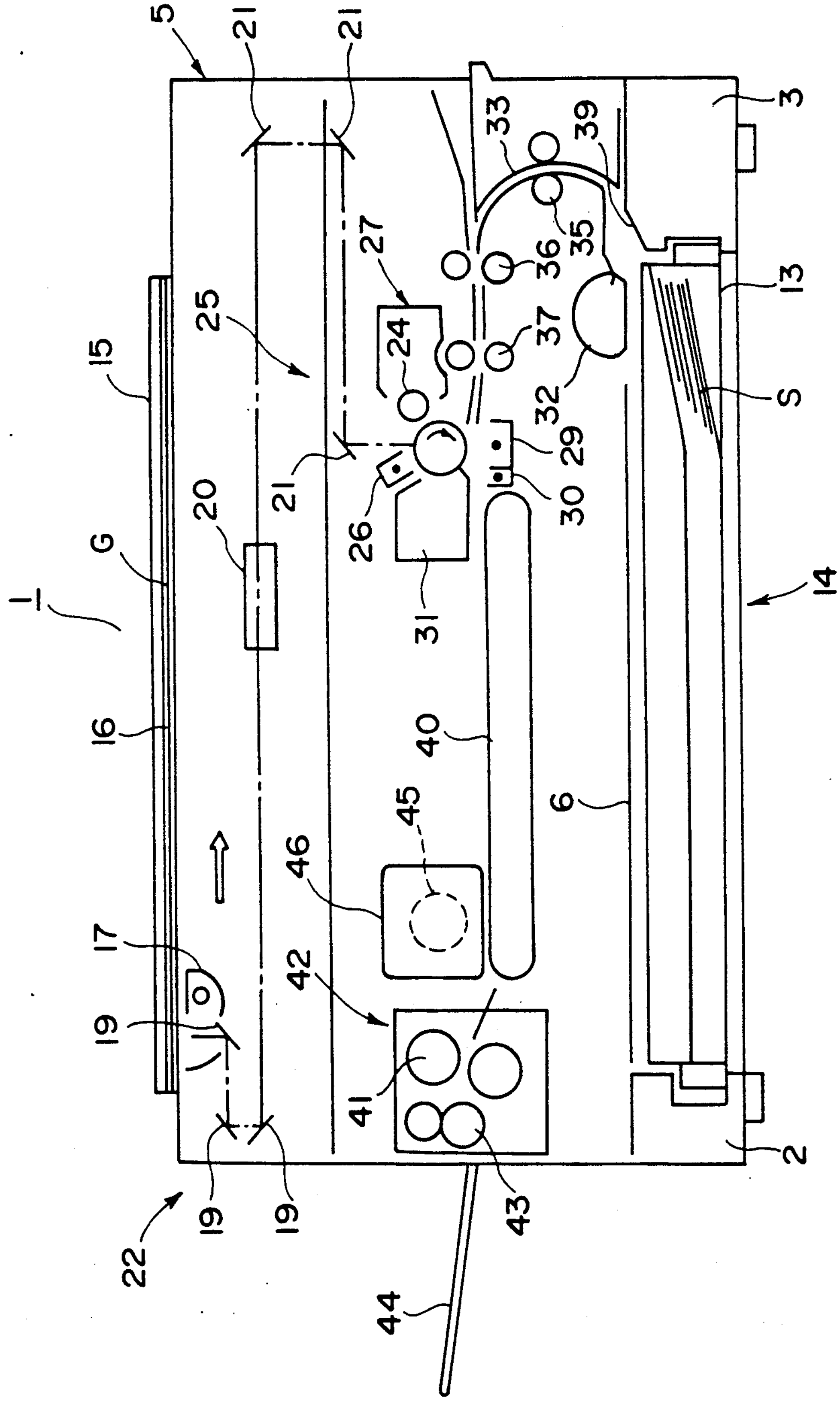
FIG. 3 is an elevational view of an image forming apparatus embodied as a copying machine, according to an embodiment of the present invention.

An image forming apparatus embodied as a copying machine 1 includes a rectangular frame 5 having a pair of left and right legs 2 and 3 made of resin material, as shown in FIG. 3. As best seen in FIGS. 1 and 2, the frame 5 comprises a framework structure obtained by assembling, in a rectangular shape, a bottom plate 6, front side plate 7, optical support 10, and left and right stay members 11 and 12. More particularly, the metal bottom plate 6 formed by a drawing technique is assembled on the left and right legs 2 and 3, and the front side plate 7 having an opening 7*a* is uprightly fixed on a front portion of the bottom plate 6. A shallow box-shaped rear side plate 9 is assembled on a rear portion of the bottom plate 6 in confronting relation to the front side plate 7. The rear side plate 6 is abutted, at its front face, against a rear end wall 6a of the bottom plate 6 and has a lower end portion 9a extending to the lower ends of the legs 2 and 3. With this arrangement, a large space or cavity 9b is created behind the rear side plate 9, into which various parts, particularly electrical mounting parts such as a printed circuit board and the like can effectively be arranged. The optical support 10 and the left and right stay members 11, 12 are bridged between the front and rear side plates 7 and 9, so that the rigidity of an upper portion of the framework of the frame 5 is maintained by these elements 10, 11, 12 and an optical box for receiving an optical system (described later) is formed therebetween.

Further, cassette guides 2a and 2b are formed on inner surfaces of the left and right legs 2 and 3, respectively, and provide a cassette mounting portion 14 therebetween. In this way, a sheet cassette 13 accommodating a number of sheets S therein can be inserted from a front side A of the frame 5 along the cassette guides 2a, 3a and mounted to the cassette mounting portion 14. In addition, steps 2c and 2d are formed on the rear portion of each of the cassette guides 2a and 3a, so that, during the initial insertion of the cassette, the sheet cassette 13 is guided apart from the bottom plate 6, and, just before the completion of the insertion, the sheet cassette is lifted by the steps 2c and 2d to be positioned in a normal mounting position. In this way, while the sheet cassette 13 is mounted or dismounted, the sheet cassette is moved without contacting with a sheet feed roller 32 (fully described later), whereby the sheet cassette can be mounted or dismounted without interference with the sheet feed roller.

Further, front surfaces 2b, 3b and outer side surfaces 2c', 3c of the left and right legs 2, 3 constitute a part of an external surface of the frame 5.

In addition, two front and rear recesses 2g, 2g and 3g, 3g are formed in the bottom surfaces of the left and right legs 2 and 3, respectively, which recesses act as concave gripping portions when the frame 5 is lifted by hand. The legs 2, 3 are installed on the ground or other operating surface through foot portions 2f.

As shown in FIG. 3, an original pressure plate 15 and an original support 16 made of glass are arranged on the top of the frame 5. Within the optical box situated below the glass support 16, the optical system 22 including an illumination lamp 17, movable mirrors 19, focusing lens 20 and fixed mirrors 21 is arranged. An image forming portion 25 comprising a photosensitive drum 23 and the like is arranged below the optical system 22. The image forming portion 25 further includes a primary charger 26, a developing device 27 having a developing sleeve 24 and holding a toner therein, a transfer charger 29, a discharger 30 and a cleaner 31, which elements 26–31 are arranged around the photosensitive drum 23.

Further, the afore-mentioned cassette mounting portion 14 is positioned below the image forming portion 25, in which the sheet cassette 13 guided by the cassette guides 2a, 3a is removably mounted. Above the cassette mounting portion 14, the above-mentioned semi-circular sheet feed roller 32 is arranged. Between the sheet feed roller 32 and the image forming portion 25, there is arranged a sheet feeding path 33 along which leading slip rollers 35 and trailing slip rollers 36 are arranged.

A guide surface 39 for guiding the sheet S is formed on a portion of the right leg 3 facing to the sheet feed roller 32, whereby the sheet S is moved from the sheet cassette 13 to the sheet feeding path 33 while being guided along the guide surface 39 by means of the sheet feed roller 32.

A conveyor belt 40 is arranged adjacent to the image forming portion 25; downstream of the conveyor belt 40, a fixing portion 42 having a fixing roller 41, an ejector roller 43 and a sheet receiver tray 44 are arranged.

In the copying machine 1 having the above-mentioned construction, a copying operation is carried out as follows:

An original G positioned on the original glass support 16 is illuminated by the illumination lamp 17 to create a light image which passes through the focusing lens 20 through the medium of the movable mirrors 19 and then is directed onto the photosensitive drum 23 of the image forming portion 25 through the fixed mirrors 21. In this case, the illumination lamp 17 and the movable mirrors 19 are shifted at predetermined speeds in a direction shown by an arrow to scan the original G. On the other hand, since the photosensitive drum 23 is rotating in a direction shown by an arrow while being applied uniform charge to the surface thereof by means of the primary charger 26, electrostatic latent image corresponding to the image on the original is sequentially formed on the surface of the photosensitive drum 23. The latent image is visualized by the developing device 27 including the toner therein to form a toner image. Then, the toner image is transferred onto the sheet S by the action of the transfer charger 29.

The sheets S are at first contained in the sheet cassette 13 and are picked up one by one from above by means of the sheet feed roller 32. The picked-up sheet then passes through the leading rollers 35 and the trailing rollers 36 along the sheet feeding path 33, and then passes through regist rollers 37 to reach a fixing station of the image forming portion 25.

The sheet S to which the toner image is transferred is separated from the photosensitive drum 23 by means of the separating discharger 30, and is sent to the fixing portion 42 by the conveyor 40, where the toner image is fixed. Thereafter, the sheet S is ejected onto the sheet receiver tray 44 by the ejector roller 43.

Next, a driving operation for the copying machine will be fully explained.

Figure 4:
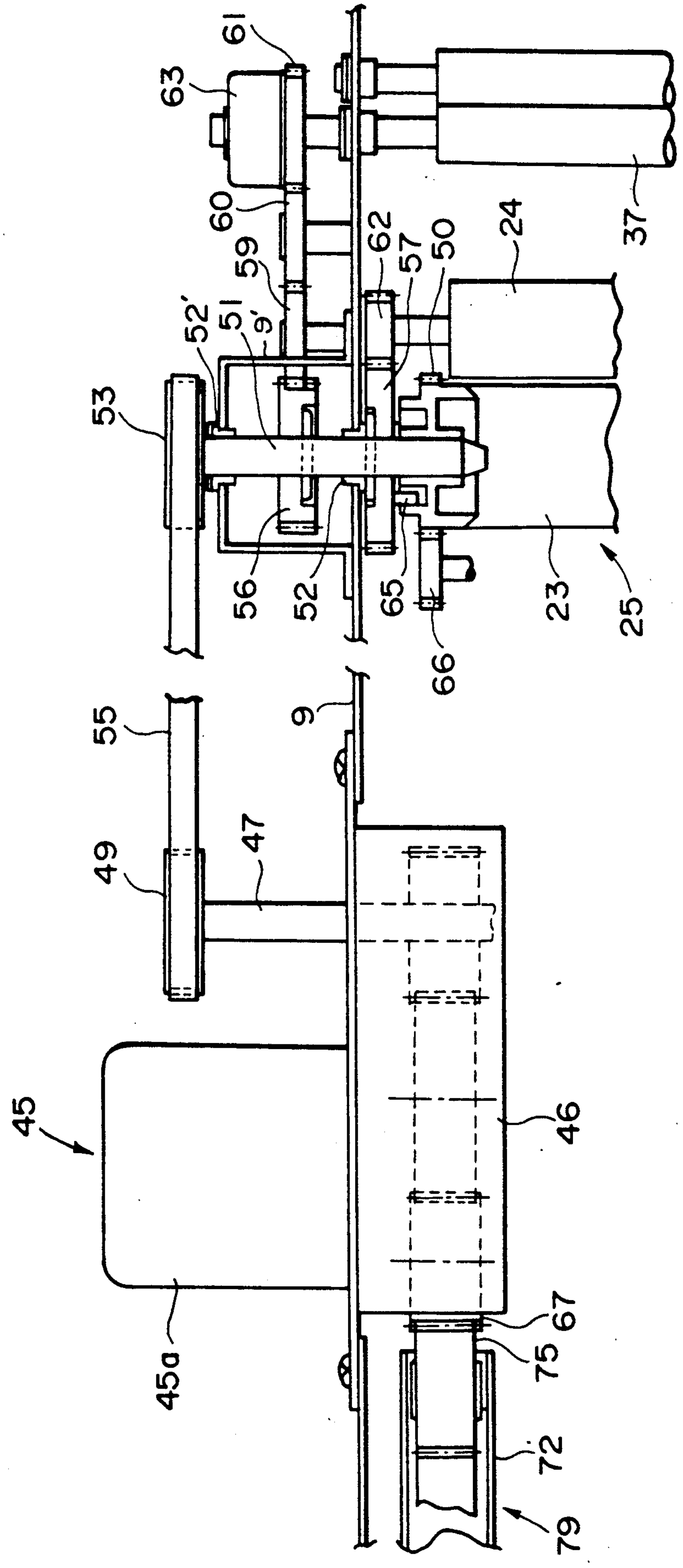
FIG. 4 is a plan view showing the connection between a main motor and driven parts of the copying machine of FIG. 3.

A main motor 45 (FIG. 3) having a gear head (reduction gear mechanism) 46 is arranged in the vicinity of the fixing portion 42. As shown in FIG. 4, the main motor 45 is fixed to the rear side plate 9 in such a manner that a rotor portion 45a thereof projects toward outside the machine frame 5 and the gear head 46 thereof projects toward inside the frame 5. An output shaft 47 is protruded from one end of the gear head 46 toward outside the machine frame 5, on which shaft 47a a pulley 49 is fixedly mounted. On the other hand, a drum driving shaft 51 mounted to a drum driving gear 50 fixedly attached to one end of the photosensitive drum 23 is rotatably supported by the rear side plate 9 and a support frame 9' through bearings 52 and 52', respectively. A drum driving pulley 53 is fixedly mounted on the free end of the drum driving shaft 51, and a timing belt 55 is arranged between and around the pulleys 53 and 49.

A tension of the timing belt can be adjusted by adjusting an attachment position at which the main motor 45 is attached to the rear side plate 9.

Further, on the drum driving shaft 51, a regist roller driving gear 56 for transmitting a driving force to the regist roller 37 and a developer driving gear 57 for transmitting a driving force to the developing sleeve 24 are fixedly mounted. The regist roller driving gear 56 is operatively connected to a regist roller gear 61 fixed to the regist roller 37 through idle gear 59 and 60; on the other hand, the developer driving gear 57 is engaged by a gear 62 fixed to the developing sleeve 24.

The regist roller gear 61 is engaged by an electromagnetic clutch 63 arranged the free end of the regist roller 37, so that the regist roller 37 is controlled to rotate or stop by turning the electromagnetic clutch 63 ON or OFF.

The developer driving gear 57 is provided with a coupling 65 which is engaged by the drum driving gear 50 to transmit the driving force transmitted to the drum driving shaft 51 (from the main motor 45) to the photosensitive drum 23 through the coupling 65. Further, the drum driving gear 50 meshes with a cleaner 66 to operate the cleaner 31 in synchronous with the rotation of the photosensitive drum 23.

The driving force or rotational force generated by the main motor 45 is transmitted to the drum driving pulley 53 through the output shaft 47, pulley 49 and timing belt 55 to rotate the drum driving shaft 51. The rotation of the drum driving shaft 51 is, on one hand, transmitted to the gear 62 through the developer driving gear 57 to rotate the developing sleeve 24, and is, on the other hand, transmitted to the drum driving gear 50 through the coupling 65 to rotate the photosensitive drum 23. Further, the driving force transmitted to the drum driving gear 50 is transmitted to the cleaner gear 66 to rotate the cleaner 31. In addition, the rotational force transmitted to the drum driving shaft 51 is also transmitted to the regist roller gear 61 through the regist roller driving gear 56 and idle gears 59, 60 to drive the regist roller under the control of the electromagnetic clutch 63.

In this way, since the photosensitive drum 23 is substantially directly driven from the driving source (main motor) merely through the timing belt 55, uneven or non-uniform rotation of the photosensitive drum 23 due to the driving force transmission mechanism can substantially be prevented. In addition, since the driving mechanism for the photosensitive drum 23 is consisted of the drum driving shaft 51 directly drivingly rotated by the driving source, bearings 52. 52' for supporting the shaft 51, the support for the bearings and the developer driving gear 57 with the coupling 65, such driving mechanism can be constituted by the least parts or elements to make the mechanism compact.

Figure 5:
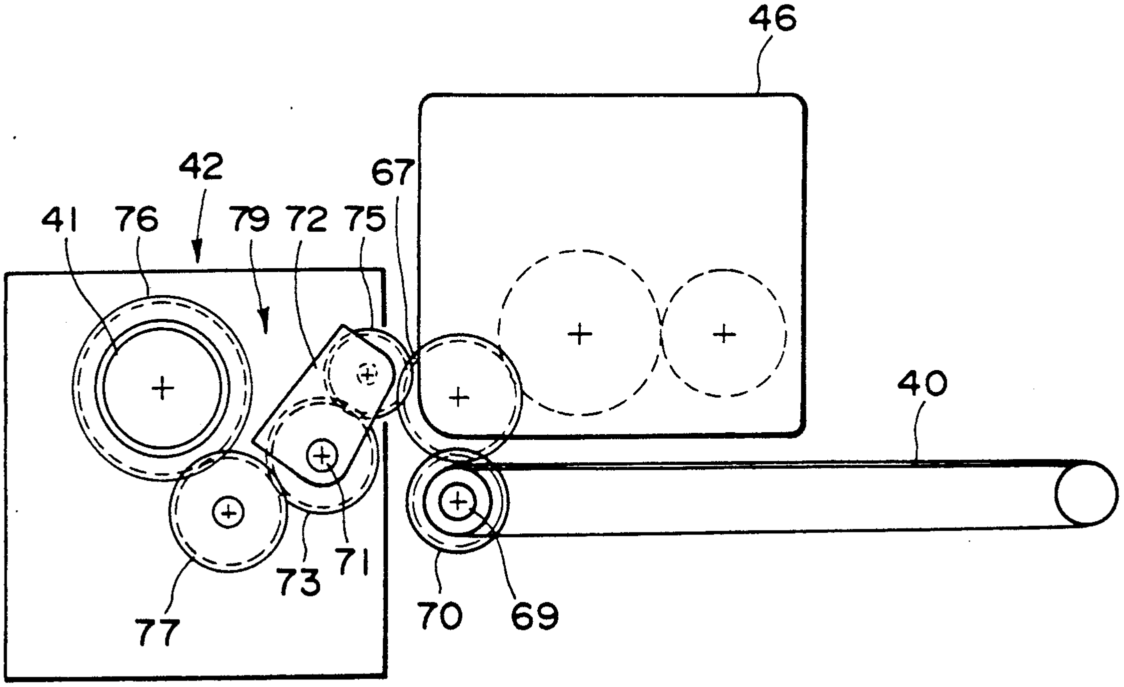
FIG. 5 is an elevational view showing the connection between the main motor and a fixing section of the copying machine of FIG. 3.

Further, as shown in FIG. 5, the gear head 46 is provided with an output gear 67 for outputting the power to the conveyor belt 40 and the fixing portion 42, which output gear is directly engaged by a belt driving gear 70 fixed to a driving shaft 69 of the conveyor belt 40. On the other hand, in the fixing portion 42, a rockable plate 72 pivotally mounted on a pivot pin 71 is arranged adjacent to the output gear 67. On the rockable plate 72, a central gear 73 coaxial with the pivot pin 71 and a swingable gear 75 meshed with the central gear are rotatably mounted. When it is desired to transmit the driving force from the gear head 46 to the fixing portion 42, the swingable gear 75 is engaged by the output gear 67. Further, the fixing roller 41 is provided with a fixing roller gear 76 fixed thereto, which gear 76 is operatively connected to the central gear 73 through an idle gear 77. A gear train comprising the swingable gear 75, central gear 73 and the idle gear 77 constitutes a gear power transmission means 79.

The rotational force from the main motor 45 is transmitted to the belt driving gear 70 through the output gear 67 to drive the conveyor belt 40. At the same time, the rotational force from the main motor 45 is also transmitted to the swingable gear 75 meshed with the output gear 67 and then is tarnsmitted to the fixing roller gear 76 fixed to the fixing roller 41 through the central gear 73 and idle gear 77 to positively drive the fixing roller 41.

As mentioned above, since the single main motor 45 is associated with two output means (output shaft 47 and output gear 67), and since, as to the fixing portion 42 required for the positive driving force, the driving source (main motor) is operatively connected to the fixing portion 42 through the gear train associated with the output gear 67 and, as to the operation of the image forming portion 25 and others, the driving source is operatively connected to the drum driving shaft 51 through the belt associated with the output shaft 47, there is no need to use a plurality of motors, thus simplifying the construction. Further, an adequate driving force can be supplied to the fixing portion 42. In addition, the load generated from the fixing portion 42 is effectively absorbed by the timing belt 55 not to transmit it to other image treating mechanisms, thus reducing noise.

Further, since the main motor 45 is arranged in the vicinity of the fixing portion 42, there is no need to provide a number of timing belts and/or roller chains, thus simplifying the construction of the driving mechanism. In addition, by arranging the main motor 45 in the vicinity of the fixing portion 42, since the main motor 45 which is one of heat generating sources is positioned remote from the photosensitive drum 23 which must not be heated, it is possible to control the temperature of the photosensitive drum easily.

What is claimed is:

1. An image forming apparatus in which a sheet containing means for containing sheet is removably mounted to a body of the apparatus, comprising a frame structure having:

a pair of left and right bases spaced apart from each other;

a bottom plate arranged on said bases;

a first side plate arranged at one end of said bases and uprightly mounted on said bottom plate;

a second side plate arranged in confronting relation to said first side plate at the other end of said bases and having a lower end portion extending below said bases and covering said other end of said bases; and a stay means for interconnecting said first and second side plates at their upper portions;

wherein a mounting portion for mounting said sheet containing means is formed by a space enclosed by said bases, said bottom plate and said second side plate.

2. An image forming apparatus according to claim 1, wherein said left base is completely independent from said right base.

3. An image forming apparatus according to claim 1, wherein said second side plate has a surface abutted against an end portion of said bottom plate.

4. An image forming apparatus according to claim 1, wherein said bases have guides formed thereon, for guiding said sheet containing means when the latter is mounted.

5. An image forming apparatus according to claim 4, wherein said sheet containing means comprises a cassette.

6. An image forming apparatus according to claim 1, wherein said stay means comprises at least one stay 7. An image forming apparatus according to claim 1, wherein said stay means comprises a pair of left and right stay members.

8. An image forming apparatus according to claim 1, wherein a direction to which said sheet containing means is mounted or dismounted is perpendicular to a sheet feeding direction in said image forming apparatus.

9. An image forming apparatus according to claim 8, wherein said first side plate is positioned at a front side of said image forming apparatus.

10. An image forming apparatus in which a sheet containing means for containing sheet is removably mounted to a body of the apparatus, comprising:

a pair of legs for supporting the body of the image forming apparatus on an operating surface, said legs being arranged below a bottom frame of said body of the apparatus and formed independently from said bottom frame; and guiding means formed on each of said legs, for guiding said sheet containing means when the latter is mounted;

wherein a mounting portion for mounting said sheet containing means is formed by a space enclosed by said legs and said bottom frame.

11. An image forming apparatus in which a sheet containing means for containing sheet is removably mounted to a body of the apparatus, comprising:

a pair of legs arranged below a bottom frame of said body of the apparatus and formed independently from said bottom frame; and guiding means formed on each of said legs, for guiding said sheet containing means when the latter is mounted;

wherein a mounting portion for mounting said sheet containing means is formed by a space enclosed by said legs and said bottom frame; and wherein a height of said legs is larger than a thickness of said sheet containing means, whereby said sheet containing means is prevented from contacting an operating surface.

12. An image forming apparatus in which a sheet containing means for containing sheet is removably mounted to a body of the apparatus, comprising:

a pair of legs arranged below a bottom frame of said body of the apparatus and formed independently from said bottom frame; and guiding means formed on each of said legs, for guiding said sheet containing means when the latter is mounted;

wherein a mounting portion for mounting said sheet containing means is formed by a space enclosed by said legs and said bottom frame; and wherein at least one concave gripping portion is formed in undersurfaces of said legs.

13. An image forming apparatus according to claim 10, wherein a direction to which said sheet containing means is mounted or dismounted is perpendicular to a sheet feeding direction in said image forming apparatus.

14. An image forming apparatus according to claim 13, wherein an opening for mounting or dismounting said sheet containing means is formed at a front side of said image forming apparatus.

15. An image forming apparatus according to claim 10, wherein said legs have innerside guides formed thereon, for guiding directly a cassette of said sheet containing means when the cassette is mounted.

* * * * *

UNITED STATES PATENT AND TRADEMARK OFFICE
CERTIFICATE OF CORRECTION

PATENT NO. : 5,023,658
DATED : June 11, 1991
INVENTOR(S) : Toyama et al.

It is certified that error appears in the above-identified patent and that said Letters Patent is hereby corrected as shown below:

[57] ABSTRACT,
Lines 7 and 10, "ends" should read --end--.

COLUMN 2,
Line 12, "in" should read --to --.

COLUMN 7,
Line 5, "stay" should read --stay member--.

Signed and Sealed this

Seventh Day of December, 1993

*Attest:*

BRUCE LEHMAN

*Attesting Officer*

*Commissioner of Patents and Trademarks*